United States Patent
Won et al.

(10) Patent No.: US 9,144,032 B2
(45) Date of Patent: Sep. 22, 2015

(54) CONTROLLING THE RADIATION PATTERN OF A MOBILE TERMINAL ACCORDING TO A POSTURE OF THE MOBILE TERMINAL

(75) Inventors: Youn Su Won, Suwon-si (KR); Byung Hwa Park, Hwaseong-si (KR); Seong Beom Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 13/397,031

(22) Filed: Feb. 15, 2012

(65) Prior Publication Data

US 2012/0208554 A1 Aug. 16, 2012

(30) Foreign Application Priority Data

Feb. 16, 2011 (KR) .................. 10-2011-0013563

(51) Int. Cl.
*H04W 52/24* (2009.01)
*H04W 52/28* (2009.01)
*H04W 52/14* (2009.01)

(52) U.S. Cl.
CPC .......... *H04W 52/245* (2013.01); *H04W 52/288* (2013.01); *H04W 52/146* (2013.01)

(58) Field of Classification Search
CPC ... H04W 52/00; H04W 52/04; H04W 52/143; H04W 52/146; H04W 52/245; H04W 4/12; H04W 52/288; H04M 1/0214
USPC ................ 455/522, 550.1, 571, 575.7, 127.1, 455/127.2
See application file for complete search history.

(56) References Cited

U.S. PATENT DOCUMENTS

| | | | |
|---|---|---|---|
| 6,512,917 B1 * | 1/2003 | Hiramatsu | 455/69 |
| 7,212,164 B2 * | 5/2007 | Miyano et | 343/702 |
| 7,330,705 B2 * | 2/2008 | Lee | 455/117 |
| 8,436,784 B2 * | 5/2013 | Jalali Mazlouman et al. | 343/895 |
| 2004/0176125 A1 * | 9/2004 | Lee | 455/522 |
| 2007/0216584 A1 * | 9/2007 | Nishikido et al. | 343/702 |
| 2007/0259689 A1 * | 11/2007 | Kutaragi | 455/556.1 |
| 2008/0317175 A1 * | 12/2008 | Ito | 375/345 |
| 2009/0253459 A1 * | 10/2009 | Naganuma et al. | 455/556.1 |
| 2009/0305742 A1 * | 12/2009 | Caballero et al. | 455/566 |
| 2010/0279751 A1 * | 11/2010 | Pourseyed et al. | 455/575.7 |
| 2011/0021139 A1 * | 1/2011 | Montgomery et al. | 455/41.1 |
| 2011/0237306 A1 * | 9/2011 | Kamii | 455/566 |

* cited by examiner

*Primary Examiner* — Nizar Sivji

(74) *Attorney, Agent, or Firm* — Jefferson IP Law, LLP

(57) ABSTRACT

A transmission method and apparatus of a mobile terminal including an antenna are provided. The transmission method includes determining a posture of the mobile terminal in an active state, updating a preset reference power by adding a power gain determined according to the posture of the mobile terminal, and transmitting a transmit signal amplified according to the updated reference power. Accordingly, the reference power is adjusted according to the posture of the mobile terminal, whereby it is possible to control the radiation pattern of antenna of the mobile terminal.

11 Claims, 5 Drawing Sheets
(1 of 5 Drawing Sheet(s) Filed in Color)

(a)

(b)

CONTROLLING THE RADIATION PATTERN OF A MOBILE TERMINAL ACCORDING TO A POSTURE OF THE MOBILE TERMINAL

PRIORITY

This application claims the benefit under 35 U.S.C. §119(a) of a Korean patent application filed on Feb. 16, 2011 in the Korean Intellectual Property Office and assigned Serial No. 10-2011-0013563, the entire disclosure of which is hereby incorporated by reference.

BACKGROUND OF THE INVENTION

1. Field of the Invention

The present invention relates to a mobile terminal. More particularly, the present invention relates to a transmission method and apparatus of a mobile terminal having an antenna in a wireless communication system.

2. Description of the Related Art

Recently, wireless communication systems have been designed to support various multimedia services based on an integrated supplementary functionality such as a Global Positioning System (GPS), Bluetooth, and the Internet. In order to facilitate providing various multimedia services, a high data rate must be secured for transmitting high volume multimedia data. An antenna is one factor that determines transmission performance. Thus research has been conducted to acquire high quality antenna features because the antenna of a mobile terminal is substantially responsible for transmitting signals carrying multimedia services. In a mobile communication terminal, it is preferred to implement the antenna to have an optimal radiation pattern. The optimal radiation pattern can be acquired through several times of tuning processes in a manufacturing state.

Meanwhile, mobile communication terminals are manufactured with a slim and compact design to secure portability. Conventional antennas such as a rod antenna and a helical antenna are exposed partially out of a terminal casing, which compromises portability and causes physical damage of the antenna. In order to address these problems, recent mobile terminals have been equipped with an internal antenna, which is also referred to as an intenna.

However, the conventional mobile terminals are designed to transmit signals in a fixed radiation pattern determined as being optimal, resulting in antenna utilization efficiency problems because the optimal radiation pattern of the antenna is determined without consideration of a user's assumption factor of Electro-Magnetic Interference (EMI), i.e., Specific Absorption Rate (SAR). The signal transmitted according to the radiation pattern of the antenna can be absorbed as noise by the terminal user's body. Such EMI noise can result in a bad influence to the human body, more particularly, to the brain.

SUMMARY OF THE INVENTION

An aspect of the present invention is to address at least the above-mentioned problems and or disadvantages and to provide at least the advantages described below. Accordingly, an aspect of the present invention is to provide a transmission method and apparatus of a mobile terminal that is capable of adjusting an antenna's radiation pattern, resulting in improvement of transmission performance.

Another aspect of the present invention is to provide a transmission method and apparatus of a mobile terminal that is capable of reducing Specific Absorption Rate (SAR) by adjusting an antenna's radiation pattern.

In accordance with an aspect of the present invention, a transmission method of a mobile terminal including an antenna is provided. The method includes determining a posture of the mobile terminal in an active state, updating a preset reference power by adding a power gain determined according to the posture of the mobile terminal, and transmitting a transmit signal amplified according to the updated reference power.

The transmission method may include amplifying the transmit power of the transmit signal according to the reference power and updating, when the transmit power is less than the reference power, the reference power by adding a new power gain.

In accordance with another aspect of the present invention, a transmission apparatus of the mobile terminal is provided. The apparatus includes a posture detection unit for detecting a posture of the mobile terminal in an active state, a control unit for controlling the posture detection unit to update a preset reference power by adding a power gain determined according to the posture of the mobile terminal, a Radio Frequency (RF) unit which amplifies a transmit signal according to the reference power under the control of the control unit, and an antenna for radiating the transmit signal.

The RF unit may include a power amplifier for amplifying a transmit power of the transmit signal according to the reference power, and a power detector for determining whether the transmit power is less than the reference power.

The control unit may update, when the transmit power is less than the reference power, the reference power by adding a new power gain.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
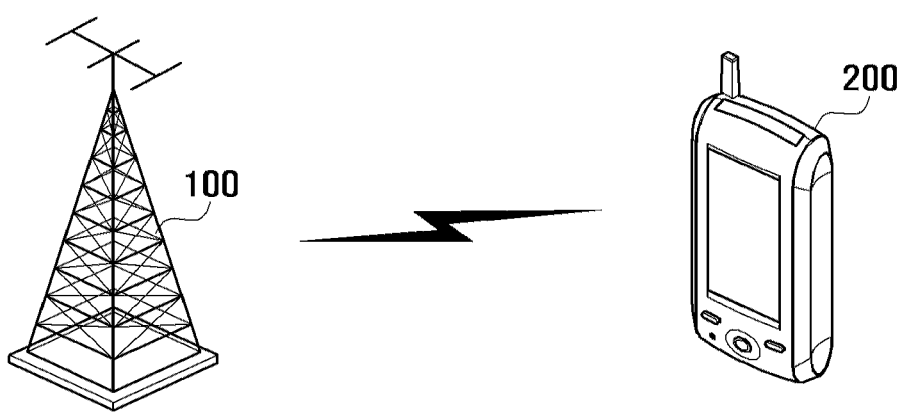
FIG. 1 is a schematic diagram illustrating a configuration of a wireless communication system to which a transmission method is applied according to an exemplary embodiment of the present invention.

FIG. 1 is a schematic diagram illustrating a configuration of a wireless communication system to which a transmission method is applied according to an exemplary embodiment of the present invention.

Referring to FIG. 1, the wireless communication system includes a base station 100 and a mobile terminal 200.

In the wireless communication system, the base station 100 and the mobile terminal 200 can perform radio communication with each other. Once the mobile terminal 200 has entered a service area of the base station 100, it can receive signals from the base station 100. Within the service area of the base station 100, the mobile terminal 200 connects to the base station 100. At this time, the mobile terminal 200 receives signals from the base station 100. The mobile terminal 200 can transmit and receive signals to and from the base station 100 in an active state. For example, the mobile terminal 200 in an active state can perform a call establishment process with the base station 100 and request or wait for an incoming call in a standby mode.

Figure 2:
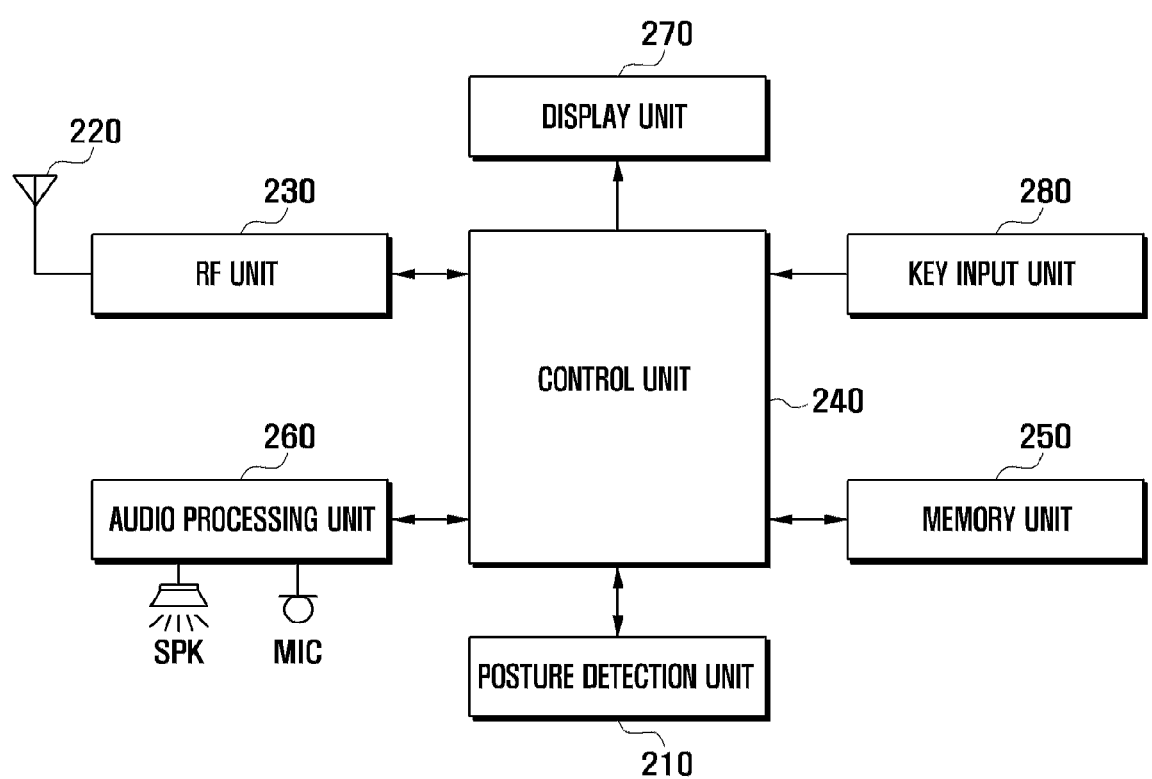
FIG. 2 is a block diagram illustrating a configuration of the mobile terminal of FIG. 1 according to an exemplary embodiment of the present invention.

FIG. 2 is a block diagram illustrating a configuration of the mobile terminal of FIG. 1 according to an exemplary embodiment of the present invention. In an exemplary implementation, descriptions are directed to a mobile phone as a representative mobile terminal.

Referring to FIG. 2, the mobile terminal 200 includes a posture detection unit 210, an antenna 220, a Radio Frequency (RF) unit 230, a control unit 240, a memory unit 250, an audio processing unit 260, a display unit 270, and a key input unit 280.

The posture detection unit 210 detects a posture of the mobile terminal 200. That is, the posture detection unit 210 can determine at least one of an angle and location in relation to the ground. The posture detection unit 210 can be implemented by at least one of an acceleration sensor, a gyro sensor, and a terrestrial magnetic sensor.

The antenna 220 receives and transmits radio signals. That is, the antenna 220 radiates and receives radio signals. At this time, Total Radiate Power (TRP) of the transmit signal is determined based on a unique antenna gain of the antenna 220. Here, the antenna gain is determined based on the shape and electric features of the antenna 220. That is, when the transmit signal is input to the antenna with conduction power, the antenna gain is added to the conduction power such that the radiation power is determined based on the conduction power. Accordingly, the transmit signal is radiated with the radiation power at the antenna 220. For example, if the conduction power is 30 dBm and the antenna gain is −3 dBm, the antenna radiates the transmit signal at the radiation power of 27 dBm.

The antenna 220 transmits the transmit signal and receives the receive signal in a preset radiation pattern. Here, the radiation pattern is formed according to the radiation power of the transmit signal to be radiated by the antenna 220. That is, the radiation pattern can vary according to the radiation power of the transmit signal. The antenna 220 can radiate the transmit signal in an asymmetrically-formed radiation pattern in all directions. The antenna 220 also can radiate the transmit signal in a symmetrically-formed radiation pattern in all directions.

The RF unit 230 processes radio frequency signals. The RF unit 210 includes a RF transmitter and a RF receiver. The RF transmitter process the transmit signal to be radiated by means of the antenna 220. The RF receiver processes the radio signal received by means of the antenna 220.

Figure 3:
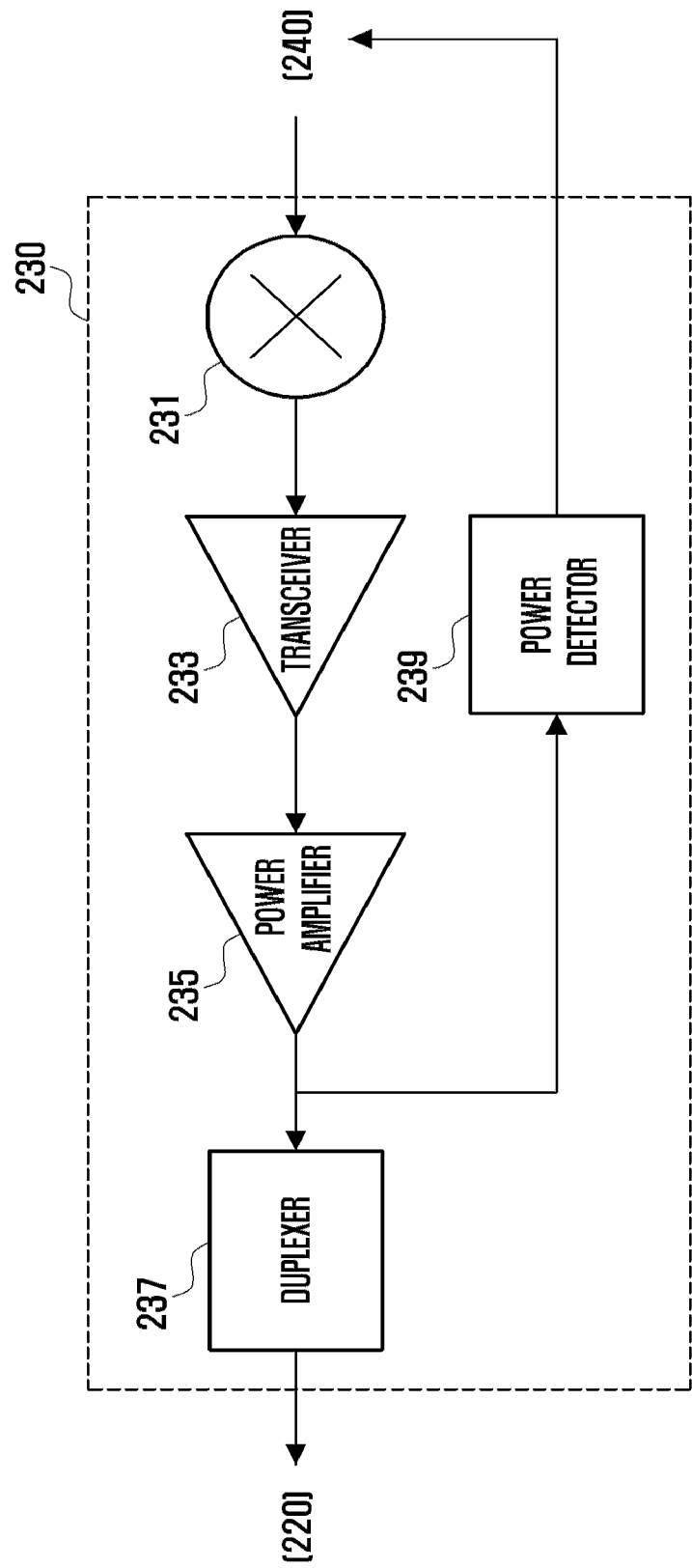
FIG. 3 is a circuit diagram illustrating a configuration of the Radio Frequency (RF) transmitter of the RF unit of FIG. 2 according to an exemplary embodiment of the present invention.

FIG. 3 is a circuit diagram illustrating a configuration of the RF transmitter of the RF unit of FIG. 2 according to an exemplary embodiment of the present invention.

Referring to FIG. 3, the RF transmitter of the RF unit 230 includes a mixer 231, a transceiver 233, a power amplifier 235, a duplexer 237, and a power detector 239.

The mixer 231 transforms the transmit signal frequency. That is, the mixer 231 up-converts the transmit signal frequency from a baseband signal to an intermediate band signal. The transceiver 233 adjusts the frequency of the transmit signal. That is, the transceiver 233 performs filtering to the transmit signal to acquire the necessary frequency bandwidth. That power amplifier 235 amplifies the transmit power according to the reference power. That is, the power amplifier 235 amplifies the transmit power of the transmit signal in correspondence with the reference power. The duplexer 237 outputs the transmit signal to the antenna 220. At this time, the duplexer 237 blocks the received signal to the RF transmitter and guides the received signal from the antenna 220 to the RF receiver. That is, the duplexer 237 separates the transmit and receive signals from each other. When the receive signal is input by means of the antenna 220, the duplexer 237 delivers the receive signal to the RF receiver. The power detector 220 detects the transmit power of the transmit signal. That is, the power detector 239 measures the transmit power of the transmit signal at the input end of the antenna 220.

The control unit 240 controls entire operations of the mobile terminal 200. The control unit 240 includes a data processing unit having a transmitter for encoding and modulating the transmit signal and a receiver for demodulating and decoding the receive signal. The data processing unit can include a modem and a codec pack. Here, the codec pack includes a data codec for processing packet data and an audio codec for processing an audio signal including voice. More particularly in an exemplary implementation, the control unit 240 controls the reference power to be applied to the transmit signal in an active state. The control unit 240 controls the RF unit 230 to amplify the transmit power of the transmit signal according to the reference power.

That is, the control unit 240 configures the reference power by analyzing the receive signal in an active state. Here, the control unit 240 can configure the reference power according to the received signal strength. The control unit 240 also can configure the reference power such that the radiation power becomes greater than a preset threshold value. For example, the control unit 240 can configure the reference power such that the sum of the reference power and the antenna gain is greater than the preset threshold value. The control unit 240 also can configure the reference power periodically. When signal reception is detected, the control unit can configure the reference power. Also, the control unit 240 can configure the reference power such that the radiation power is greater than the preset threshold value.

The control unit 240 also determines the posture of the mobile terminal 200 in an active state. Here, the control unit 240 determines the posture of the mobile terminal 200 based on at least one of an angle or position of the mobile terminal in relation to the ground. The control unit 240 also determines a power gain based on the posture of the mobile terminal 200. The control unit 240 updates the reference power by adding the power gain to the reference power.

The control unit 240 also compares the transmit power of the transmit signal with the reference power. That is, the control unit 240 determines whether the transmit power is less than the reference power. If the transmit power is less than the reference power, the control unit determines the power gain. Here, the control unit 240 can determine the power gain according to the difference between the transmit power and the reference power. The control unit 240 updates the reference power by adding the power gain to the reference power.

The memory unit 250 can include a program memory and a data memory. The program memory stores the programs necessary for controlling general operations of the mobile terminal 200. The program memory can store the programs necessary for adjusting the reference power to be applied to the transmit power according to an exemplary embodiment of the present invention. The data memory stores the data generated while the programs are running. At this time, the data memory can store the power gains corresponding to the postures available for the mobile terminal 200 according to an exemplary embodiment of the present invention. The memory unit 250 also can store the power gains corresponding to the values comparable to the difference value between the transmit power and the reference power according to an exemplary embodiment of the present invention.

The audio processing unit 260 processes the audio signal output by the audio codec of the data processing unit to be played out through a Speaker (SPK) and transfers the transmit audio signal collected through a Microphone (MIC) to the audio codec of the data processing unit.

The display unit 270 displays user data output by the control unit 240. The display unit may be implemented with a Liquid Crystal Display (LCD) and, in this case, the display unit 270 can include an LCD controller, a video memory for storing video data, and LCD devices. In a case where a touchscreen is enabled, the display unit 270 can function as an input device.

The key input unit 280 is provided with a plurality of alphanumeric keys for data input and function keys for setting various functions.

Figure 4:
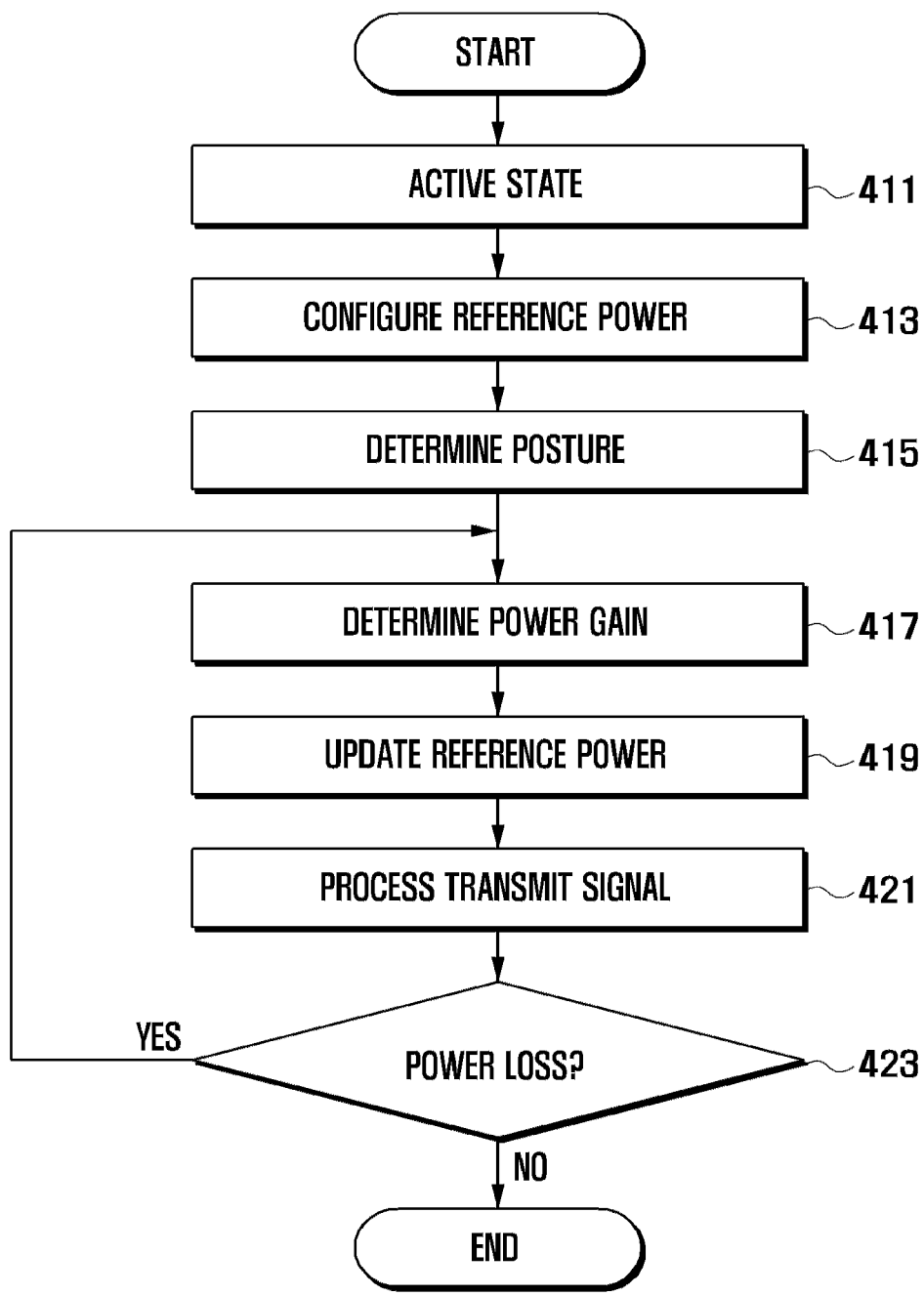
FIG. 4 is a flowchart illustrating a transmission method of a mobile terminal according to an exemplary embodiment of the present invention.
Figure 5:
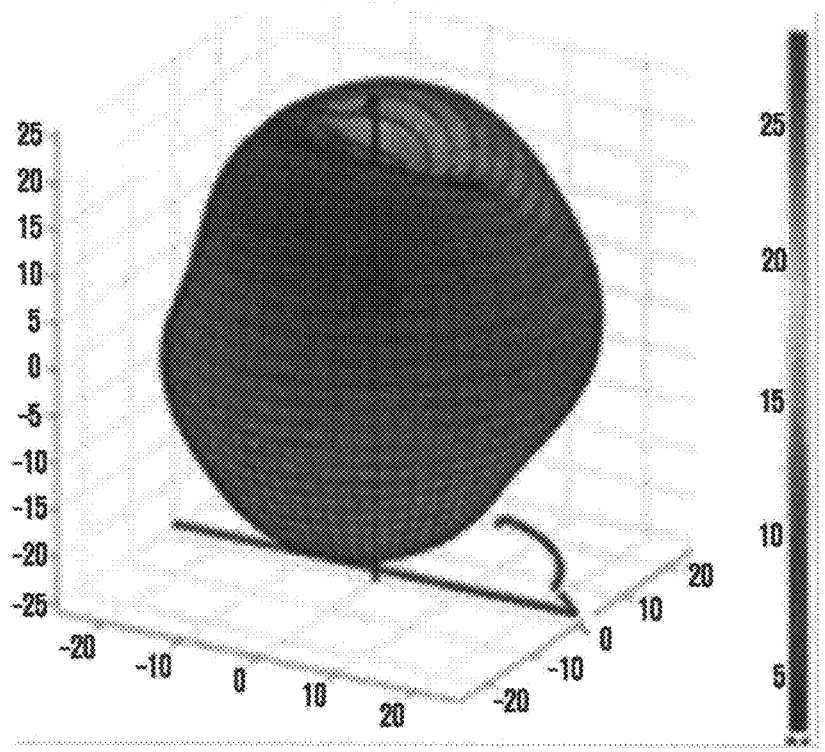
FIG. 5 is a diagram illustrating exemplary radiation patterns of an antenna of a mobile terminal according to an exemplary embodiment of the present invention.
Figure 5:
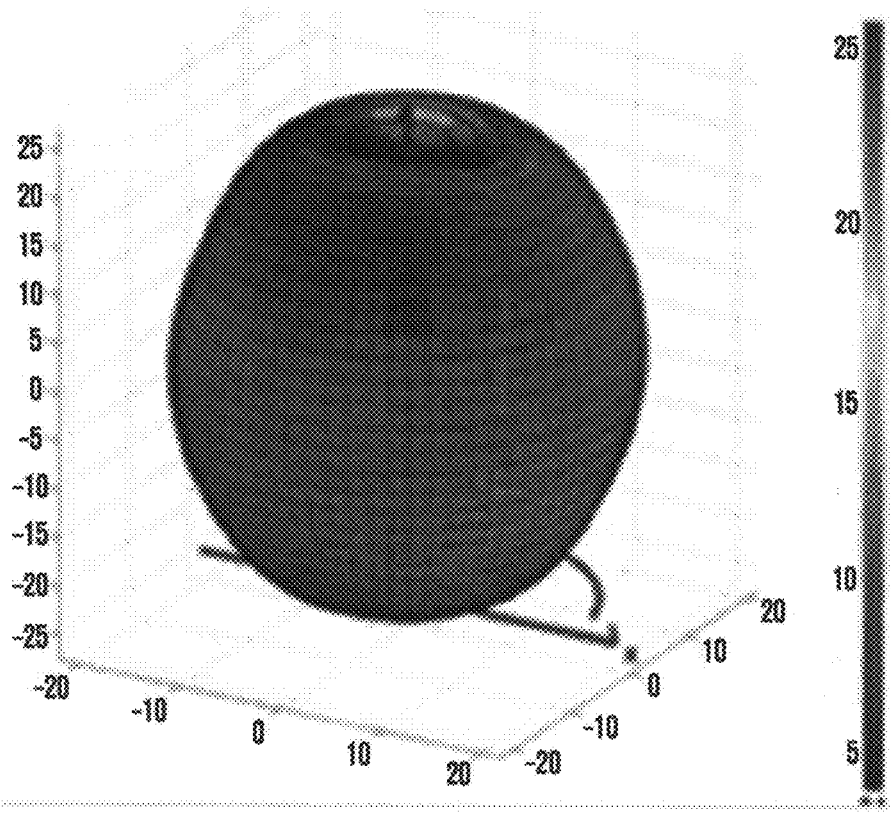

FIG. 4 is a flowchart illustrating a transmission method of a mobile terminal according to an exemplary embodiment of the present invention. FIG. 5 is a diagram illustrating exemplary radiation patterns of an antenna of a mobile terminal according to an exemplary embodiment of the present invention.

Referring to FIG. 4, in the transmission method, the mobile terminal 200 first operates in an active state at step 411. In the active state, the control unit 240 can receive radio signals. In the active state, the control unit configures the reference power at step 413. Here, the control unit 240 can configure the reference power by analyzing the received signal. For example, the control unit 240 can configure the reference power in accordance with the strength of the received signal. The control unit 240 can configure the reference power periodically and can configure the reference power when signal reception is detected. The control unit 240 also can configure the reference power such that the radiation power is greater than a preset threshold power. For example, the control unit 240 can configure the reference power such that the sum of the reference power and the antenna gain is greater than the preset threshold value. For example, if the threshold value is 27 dBm and the antenna gain is −3 dBm, the control unit 240 can set the reference power to 30 dBm.

The control unit 240 then determines the posture of the mobile terminal 200 at step 415. At this time, the control unit 240 determines the posture of the mobile terminal 200 based on at least one of an angle and position of the mobile terminal 200 in relation to the ground. The control unit 240 then determines the power gain according to the posture of the mobile terminal 200 at step 417. At this time, the memory unit 250 can store the power gains corresponding to the angles available in relation with the group as shown in Table 1. That is, the control unit 240 can select the power gain corresponding to the current posture of the mobile terminal 200. For example, when the mobile terminal 200 makes an angle of 90° in relation to the ground, the control unit 240 can select the power gain of +1 dBm.

TABLE 1

| Posture | Power gain (dBm) |
| --- | --- |
| 76° to 105° | +1 |
| 106° to 165° | 0 |
| 166° to 195° | −1 |
| — | — |
| — | — |

The control unit 240 updates the reference power at step 419. That is, the control unit 240 adds the power gain to the reference power. For example, if the reference power is 30 dBm and the power gain is +1 dBm, the control unit updates the reference power to 31 dBm. The control unit 240 processes the transmit signal at step 421. That is the control unit 240 generates the transmit signal. Sequentially, the control unit 240 controls the RF unit 230 to transmit the transmit signal through the antenna 220.

At this time, the control unit 240 controls the RF transmitter to amplify the transmit power according to the reference power. Here, the power amplifier 235 amplifies the transmit power of the transmit signal with reference to the reference power. In this manner, the radiation power of the antenna 220 is determined based on the transmit power and antenna gain, and the radiation power is determined to be greater than the threshold value. Here, the antenna 220 radiates the transmit signal in the radiation pattern corresponding to the radiation power. For example, the radiation power is 28 dBm, the antenna 220 can radiate the transmit signal in the radiation pattern formed asymmetrically at the center of the antenna

220 as illustrated in part (a) of FIG. 5. If the radiation power 27 dBm, the antenna 220 can radiate the transmit signal in the radiation pattern formed symmetrically at the center of the antenna 220 as illustrated in part (b) of FIG. 5.

Finally, the control unit 240 compares the transmit power of the transmit signal with the reference power at step 423. That is, the transmit power is detected by means of the power detector 239, the control unit 240 determines whether the transmit power is less than the reference power. In this manner, the control unit 240 can determine whether there is power loss in the transmit power as compared to the reference power. If it is determined that the transmit power is equal to or greater than the reference power at step 423, the control unit 240 ends the transmit procedure.

Otherwise, if it is determined that the transmit power is less than the reference power at step 423, the control unit 240 determines the power gain at step 417. That is, if the transmit power is less than the reference power, the control unit 24 determines an occurrence of power loss and thus decides the power gain. For this purpose, the memory unit 250 can store the power gains corresponding to the individual comparison values that can be compared with the difference values between the transmit power and the reference power as shown in Table 2. That is, the control unit 240 can select the power gain corresponding to the difference value between the transmit power and the reference power. For example, if the difference value between the transmit power and the reference power is 2 dBm, the control unit 240 can select the power gain of +1 dBm. Thereafter, the control unit 240 repeats steps 419 to 423.

TABLE 2

| Posture | Power gain (dBm) |
| --- | --- |
| Greater than 1 | +2 |
| Less than 1 and greater than 0 | +1 |
| Less than 0 and greater than −1 | 0 |
| — | — |
| — | — |
| — | — |

Although the description has been directed to the exemplary embodiments where the mobile terminal transmits or receives radio signals through the antenna, the present invention is not limited thereto. For example, exemplary embodiments of the present invention can be applied to the case where the mobile terminal having a transmit antenna and a receive antenna separated from each other. In this case, the function blocks of the mobile terminal operate in a similar manner as described above. However, the duplexer is disabled in the mobile terminal. The power amplifier of the mobile terminal amplifies the transmit signal according to the reference power and transfers the amplified signal to the antenna. In this manner, the mobile terminal adjusts the reference power to be applied to the transmitted signal in an active state and amplifies the transmit power of the transmit signal according to the reference power.

According to exemplary embodiments of the present invention, the mobile terminal can control the radiation pattern of the antenna. That is, the mobile terminal can adjust the reference power to control the radiation pattern of the antenna without changing the shape of the antenna. By adjusting the reference power according to the posture of the mobile terminal, it is possible for the mobile terminal to transmit a signal in a radiation pattern corresponding to the terminal's posture. Also, since the reference power is adjusted based on a comparison result with the transmit power, the mobile terminal can perform fine adjustment of the radiation power.

When the mobile terminal transmits the signal in the radiation pattern formed symmetrically in all directions and centered on the antenna, the Specific Absorption Rate (SAR) can be relatively high. In this case, the reference power is adjusted according to the posture of the mobile terminal such that the mobile terminal can transmit the signal in the radiation pattern formed asymmetrically in all directions and centered on the antenna. In this manner, the mobile terminal can reduce the SAR to the user. For example, when the mobile terminal is in the middle of the communication mode, the posture of the mobile terminal is likely to have the rectangular angle in relation to the ground. In this case, the mobile terminal transmits the signal in the radiation pattern formed asymmetrically in all directions and centered on the antenna, to reduce the SAR.

As described above, the transmission method and apparatus of the mobile terminal having an antenna according to an exemplary embodiment of the present invention can control the radiation pattern of the antenna of the mobile terminal. That is, it is possible to control the radiation pattern of the antenna by adjusting the reference power of the mobile terminal. At this time, the reference power is adjusted according to the posture of the mobile terminal, and thus the mobile terminal can transmit the signal in the radiation pattern corresponding to the posture of the mobile terminal. Also, since the reference power is adjusted according to the comparison result with the transmit power, it is possible to apply fine adjustment of radiation power to the mobile terminal.

When transmitting a signal in the radiation pattern formed symmetrically in all directions and centered on the antenna, the SAR to the user can be relatively high. By adjusting the reference power according to the posture of the mobile terminal, the mobile terminal can transmit the signal in the radiation pattern formed asymmetrically in all direction centering the antenna. In this manner, it is possible to reduce the SAR to the mobile terminal user. For example, in the wireless communication system, the mobile terminal is likely to be postured to have the vertical angle to the ground. At this time, the mobile terminal transmits the signal in the radiation pattern formed asymmetrically in all directions and centered on the antenna, resulting in reduction of SAR of the mobile terminal to the human body.

While the invention has been shown and described with reference to certain exemplary embodiments thereof, it will be by those skilled in the art that various changes in form and details may be made therein without departing from the spirit and scope of the invention as defined in the appended claims and their equivalents.

What is claimed is:

1. A transmission method of a mobile terminal including an antenna, the method comprising:
   determining a posture of the mobile terminal in an active state;
   updating a preset reference power by adding a power gain determined according to the posture of the mobile terminal, the posture determined according to one of an angle or a position of the mobile terminal in relation to the ground; and
   transmitting a transmit signal amplified according to the updated preset reference power in a radiation pattern according to the posture of the mobile terminal,
   wherein the mobile terminal stores a mapping of a plurality of power gains corresponding to a plurality of different postures, and wherein the radiation pattern is at least one of symmetric and asymmetric.

2. The transmission method of claim 1, wherein the determining of the posture comprises configuring the preset reference power based on analysis of a received signal.

3. The transmission method of claim 2, wherein the preset reference power is determined according to strength of the received signal.

4. The transmission method of claim 1, wherein the transmitting of the transmit signal comprises updating, when the transmit power is less than the preset reference power, the reference power by adding a new power gain.

5. The transmission method of claim 4, wherein the new power gain is determined according to a difference value between the preset reference power and the transmit power.

6. A transmission apparatus of the mobile terminal, the apparatus comprising:
 a posture detection unit configured to detect a posture of the mobile terminal in an active state, the posture determined according to one of an angle or a position of the mobile terminal in relation to the ground;
 a memory unit configured to store a mapping of a plurality of power gains to a plurality of different postures;
 a control unit configured to control the posture detection unit to update a preset reference power by adding a power gain determined according to the posture of the mobile terminal;
 a Radio Frequency (RF) unit configured to amplify a transmit signal according to the updated preset reference power under the control of the control unit; and
 an antenna configured to radiate the transmit signal in a radiation pattern according to the posture of the mobile terminal,
 wherein the radiation pattern is at least one of symmetric and asymmetric.

7. The transmission apparatus of claim 6, wherein the control unit configures the preset reference power based on analysis of a received signal.

8. The transmission apparatus of claim 7, wherein the preset reference power is determined according to strength of the received signal.

9. The transmission apparatus of claim 6, wherein the RF unit comprises:
 a power amplifier configured to amplify a transmit power of the transmit signal according to the preset reference power; and
 a power detector configured to determine whether the transmit power is less than the preset reference power.

10. The transmission apparatus of claim 9, wherein the control unit updates, when the transmit power is less than the preset reference power, the reference power by adding a new power gain.

11. The transmission apparatus of claim 10, wherein the new power gain is determined according to a difference value between the preset reference power and the transmit power.

* * * * *